United States Patent [19]

Jabbari et al.

[11] Patent Number: 5,731,928
[45] Date of Patent: Mar. 24, 1998

[54] DISC CLAMPING SYSTEM FOR A HARD DISC DRIVE

[75] Inventors: Iraj Jabbari, San Jose; Shahriar Tafreshi, Capitola, both of Calif.

[73] Assignee: Seagate Technology, Inc., Scotts Valley, Calif.

[21] Appl. No.: 794,152

[22] Filed: Feb. 3, 1997

Related U.S. Application Data

[63] Continuation of Ser. No. 374,367, Jan. 18, 1995, abandoned.

[51] Int. Cl.⁶ .................................................. G11B 17/038
[52] U.S. Cl. .................................................. 360/98.08
[58] Field of Search .............................. 360/98.08, 99.05, 360/99.12; 369/270

[56] References Cited

U.S. PATENT DOCUMENTS

| | | | |
|---|---|---|---|
| 4,683,505 | 7/1987 | Schmidt et al. | 360/98.08 |
| 5,452,157 | 9/1995 | Chow et al. | 360/99.12 |

FOREIGN PATENT DOCUMENTS

| | | |
|---|---|---|
| 210681 | 8/1990 | Japan . |
| 183057 | 8/1991 | Japan . |

Primary Examiner—Robert S. Tupper
Assistant Examiner—George J. Letscher
Attorney, Agent, or Firm—Flehr Hohbach Test Albritton & Herbert LLP

[57] ABSTRACT

A disc clamping system, for clamping at least one disc in a disc stack in a disc drive against a disc flange on the hub of a spindle motor at one end of a disc mounting portion of the spindle motor hub, which includes a cylindrical disc clamping portion of the hub at the opposite end of the disc mounting portion of the hub from the disc flange and has a diameter less than the disc mounting portion of the hub, a spring member formed from planar material which includes a circumferential corrugation near its outer extreme and a central opening dimensioned to fit over the disc clamping portion of the hub, and a heat expandable clamp ring, dimensioned to fit over and engage the disc clamping portion of the hub, the clamp ring simultaneously pressing against the spring member closely adjacent the central opening in the spring member and deforming the spring member to produce a clamping force transferred to the discs via a contact surface formed by the circumferential corrugation. In a second aspect of the invention, the clamp ring includes a plurality of notches on its inner surface allowing the insertion of a clamp removal tool to facilitate rework and repair.

8 Claims, 5 Drawing Sheets

DISC CLAMPING SYSTEM FOR A HARD DISC DRIVE

This is a continuation of application Ser. No. 08/374,367 filed Jan. 18, 1995 now abandoned.

BACKGROUND OF THE INVENTION

1. Field of the Invention

This invention relates generally to the field of hard disc drive data storage devices, or disc drives, and more specifically, but not by way of limitation, to a system for clamping the discs in fixed relationship to the hub of a spindle motor used to rotate the discs.

2. Brief Description of the Prior Art

Disc drives of the type known as "Winchester" disc drives are well known in the art. Such disc drives include at least one rigid disc mounted for rotation at a constant speed on a hub of a spindle motor. The spindle motor is typically of the brushless DC type. The discs are coated with a magnetizable medium used to store, or write, and retrieve, or read, digital data.

An actuator assembly is provided to mount a plurality of read/write heads and move the heads in a controlled manner to any desired one of a plurality of circular, concentric tracks on the disc surface.

One of the areas of disc drive design which receives a great deal of attention is the apparatus used to secure the discs to the hub of the spindle motor. In a typical disc drive, the hub of the spindle motor includes a cylindrical disc mounting area which has an outer diameter substantially the same as the inner diameter of the discs. At one end of this disc mounting area, usually at the end toward the disc drive housing base member, is a radially extending disc mounting flange, which forms a platform against which an area local to the inner diameter of a disc can rest. In disc drives employing more than one disc, annular spacers are interposed between adjacent discs about the spindle motor hub to form a "disc stack" made up of disc/spacer/disc . . . until all of the discs in the disc drive are stacked on the hub. Finally, to secure the disc stack to the spindle motor hub, some type of clamping device is employed to squeeze the disc stack against the disc mounting flange. It is this clamping which is critical to the proper operation of the disc drive.

In order for the disc drive to operate as intended, the clamping force used to secure the disc stack to the spindle motor hub must fall within a certain range: too little clamping force, and the discs might shift radially or circumferentially within the plane normal to the spindle motor's spin axis, while too great a clamping force might distort the discs themselves from the flatness necessary to properly "fly" the read/write heads.

One type of typical prior art disc clamp is stamped from sheet material, and has an outer diameter slightly larger than the inner diameter of the discs. This type of clamp is then stamped to form a circumferential corrugation near the outer edge, and screw holes are formed mating with corresponding tapped holes in the upper surface of the spindle motor hub. When screws are inserted through the clamp and torqued into the spindle motor hub, the lower surface of the circumferential corrugation contacts the upper surface of the top disc in the disc stack near its inner diameter, capturing and squeezing the disc stack between the disc clamp and the disc mounting flange on the spindle motor hub. Such a disc clamp is shown in U.S. Pat. No. 5,295,030, issued Mar. 15, 1994, assigned to the assignee of the present invention and incorporated herein by reference.

One drawback with this type of disc clamp is that the heads of the screws used to secure the disc clamp project above the disc clamp and contribute to the overall height of the disc drive. With current designs of disc drive, great emphasis is placed on reducing the overall disc drive height, and utilizing all available disc drive height for operational components, i.e., discs and heads. In such designs, it is clearly undesirable to waste vertical space with projecting screw heads.

In order to minimize wasted vertical space, it has become common to utilize clamp rings which engage the outer surface of the top of the spindle motor hub and lie in the vertical plane of the topmost head on the upper surface of the top disc. This type of clamp ring is exemplified by those shown in U.S. Pat. No. 4,933,785, issued Jun. 12, 1990, (Prairietek), and in various products manufactured by the assignee of the present invention. In the former of these examples, the inner surface of the clamp ring is tapped and screwed onto mating threads formed on the outer surface of the spindle motor hub. While this technique does contribute to lowering the overall height of the unit, it is costly to form the threads, and difficult to closely control the even distribution of the pressure applied to the disc stack.

In the latter of these examples, the clamp ring is heated to expand the clamp ring, the expanded clamp ring is placed over the top of the spindle motor hub and the desired clamping force is exerted on the clamp ring in an axis normal to the disc surfaces. The clamp ring is then allowed to cool and contract, locking the inner surface of the clamp ring in engagement with the outer surface of the spindle motor hub with the desired compressive force being applied to the disc stack. With this type of "heat-expanded" clamp ring, it is much easier to control the even distribution of clamping force than it is with the threaded clamp previously discussed.

The heat-expanded clamp ring of the prior art does, however, have a disadvantage of its own. Typical heat-expanded disc clamp rings are formed with a stepped surface on the lower surface which creates a disc contact surface closely adjacent the outermost edge of the disc clamp which contacts the disc stack, leaving an annular air gap above the top disc between the disc contact surface and the outer surface of the spindle motor hub. The material of the disc clamp between the hub and the disc contact surface acts as a "cantilever spring". This type of heat-expandable disc clamp, however, has a very large "spring rate", on the order of 45 to 60 thousand pounds/inch. This means that very slight variations in the final vertical position of the clamp ring on the spindle motor hub result in undesirably wide variations in the clamping force applied to the disc stack.

It would, therefore, be desirable to provide a disc clamping system which provides both the easily controlled clamping force of the sheet metal disc clamp with the ease of manufacturing and lowered cost of the heat-expanded disc clamp.

SUMMARY OF THE INVENTION

The present invention is a disc clamping system which includes a modification to the spindle motor hub to provide a cylindrical disc clamp mounting portion having a diameter less than the inner diameter of the discs, a disc clamp spring member formed from sheet material having a central opening with a diameter substantially equal to the outer diameter of the disc clamp mounting portion of the spindle motor hub and an outer diameter slightly larger than the inner diameter of the discs, and a heat-expandable disc clamp ring also having an inner diameter substantially equal to the disc clamp mounting portion of the spindle motor hub. In use, the disc clamp spring member is placed over the disc clamp mounting portion of the spindle motor hub, with a circumferential corrugation proximate the outer edge of the disc clamp spring member contacting the top surface of the top disc in the disc stack near the inner diameter of the disc. The heat-expandable disc clamp ring is then heated to expand the disc clamp ring, and the disc clamp ring is placed over the disc clamp mounting portion of the spindle motor hub contacting the inner diameter of the disc clamp spring member, and pressing on the inner diameter of the disc clamp spring member until the desired clamping force is developed at the circumferential corrugation of the disc clamp spring member. The disc clamp ring is then allowed to cool, bringing the innermost surface of the disc clamp ring into contact with the outer surface of the disc clamp mounting portion of the spindle motor, locking the discs into a fixed relationship with the spindle motor hub. In practice, the present invention further envisions utilizing a balancing element to maintain the balance of the entire motor/disc stack assembly.

In another aspect of the invention, features are provided in the disc clamp ring to facilitate the removal of the disc clamp elements for rework during manufacture or repair.

It is an object of the invention to provide a disc clamping system which minimizes the overall height of the disc drive.

It is another object of the invention to provide a disc clamping system in which the amount of clamping force applied to the disc clamp is easily controlled.

It is another object of the invention to provide a disc clamping system which consists of inexpensively made components, and is easily assembled in a large scale manufacturing environment.

The operation of the invention in achieving the above objects, as well as other features and benefits of the invention, can best be understood by reviewing the following detailed description of the invention in conjunction with the accompanying drawings.

DETAILED DESCRIPTION OF THE PREFERRED EMBODIMENT

Figure 1:
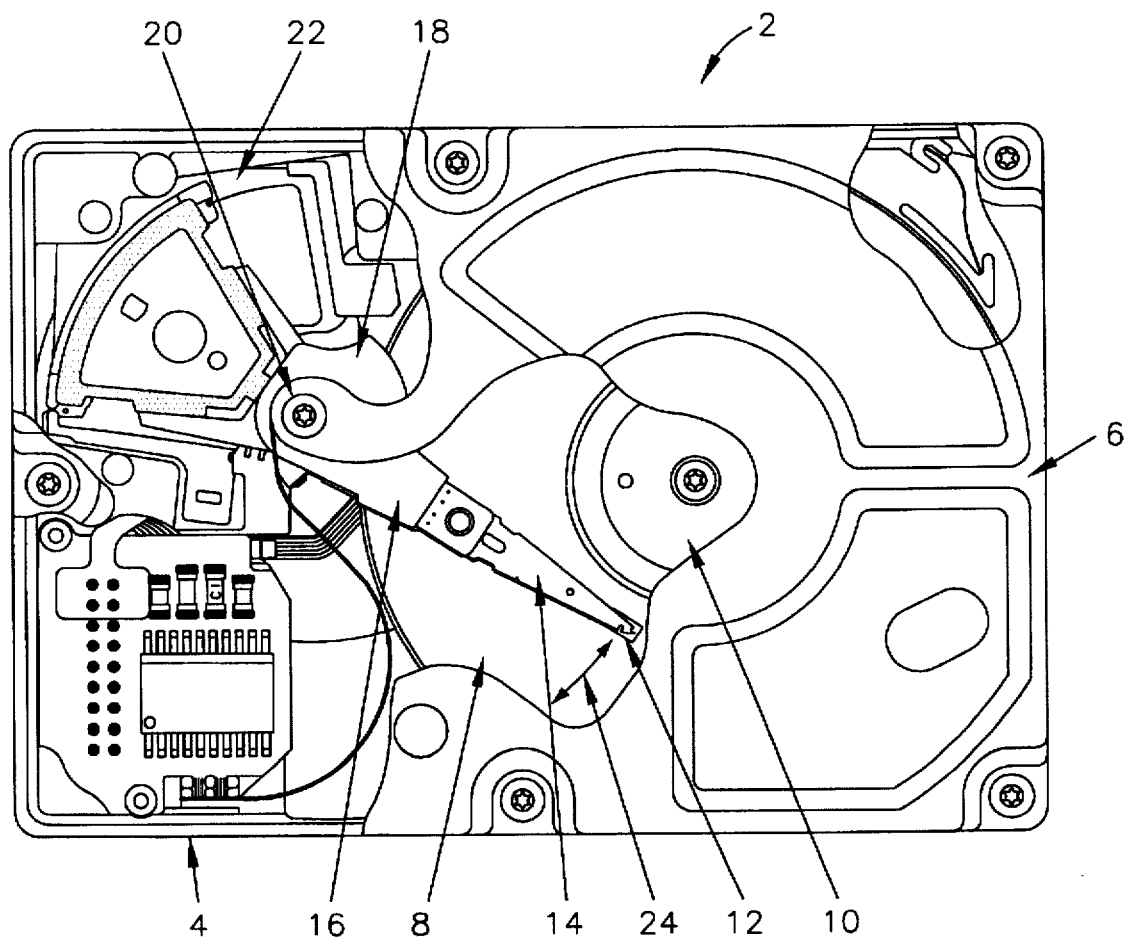
FIG. 1 is a plan view of a prior art disc drive in which the present invention is particularly useful.

Turning now to the figures, and more specifically to FIG. 1, shown is a disc drive 2 of the type in which the present invention is particularly useful. The disc drive 2 includes a base member 4 to which all other components are either directly or indirectly mounted. A top cover 6, shown in partial cutaway, attaches to the base member to form a sealed housing within which the delicate read/write components are protected from outside contaminants.

The disc drive 2 includes at least one disc 8 mounted for rotation on a spindle motor (not shown) and held in place by a disc clamp 10. A plurality of read/write heads (one shown at 12) is mounted via flexure assemblies 14 to head mounting arms 16 which are integral portions of an actuator body 18 adapted to pivot about a pivot shaft 20 under control of an actuator motor, shown generally at 22. When the actuator motor 22 drives the actuator body 18 about the pivot shaft 20, the heads 12 are controllably moved back and forth along arcuate path 24 to any desired one of a plurality of circular, concentric data tracks (not shown) on the disc surface.

Figure 2:
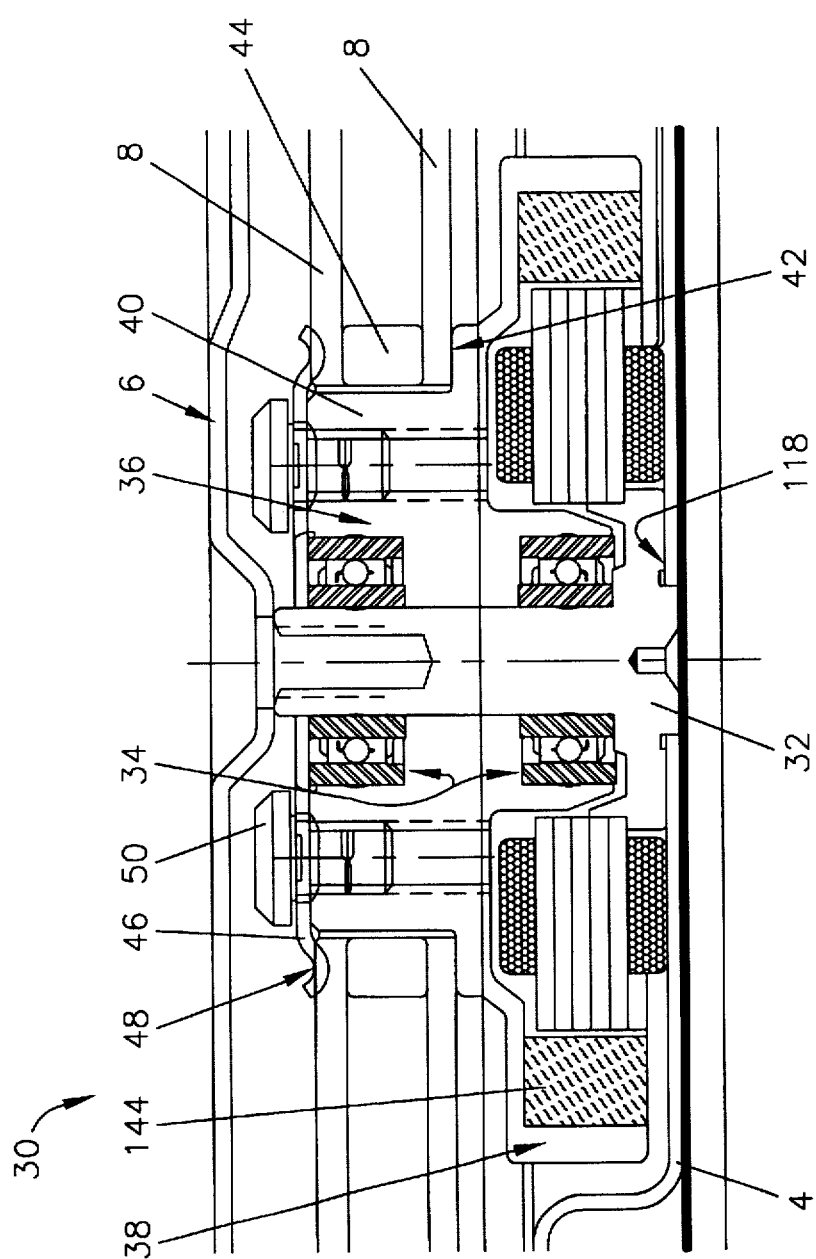
FIG. 2 is a section elevation view of a spindle motor/disc stack assembly showing a prior art disc clamping system.

Turning now to FIG. 2, shown is a section elevation view of a spindle motor/disc stack assembly 30 from the prior art. The spindle motor (not separately designated) includes a stationary shaft 32 which supports upper and lower ball bearing assemblies 34. The inner races (not separately designated) of the ball bearing assemblies 34 are fixed in relation to the stationary shaft 32, while the outer races (again not designated) of the ball bearing assemblies 34 mount and support a spindle motor hub 36 for rotation about the stationary shaft 32. The spindle motor hub 36 includes a motor component portion 38 which surrounds the permanent magnets and stator laminations and coils (all not designated), and a disc mounting portion 40.

This disc mounting portion 40 is shown to be substantially the same diameter as the inner diameter of the discs 8. The configuration shown includes two discs 8, with the lower of the two discs 8 resting on a disc mounting flange 42 which is an integral part of the spindle motor hub 36 and extends radially beyond the disc mounting portion 40 of the spindle motor hub 36 and under the inner diameter of the lower disc 8. The two discs are separated by a disc spacer 44.

Also shown is a disc clamp 46. This disc clamp 46 is of the type previously discussed and is formed from sheet metal in the form of a disc. Proximate the outer edge of the disc clamp 46, a circumferential corrugation 48 is formed projecting toward the top surface of the upper disc 8. The disc clamp 46 also includes a plurality of holes (not designated) through which screws 50 are driven into tapped holes (also not designated) in the spindle motor hub 36. When the screws 50 are tightened, the lower surface of the circumferential corrugation 48 contacts the top surface of the upper disc 8, and as the screws 50 continue to be tightened, the outer portion of the disc clamp 46 is bent upward, providing a controlled clamping force on the discs 8 and disc spacer 44. This type of disc clamp was frequently used because of the relative ease with which the clamping force could be selected and controlled. That is, by selection of the disc clamp material, thickness and dimensions, the amount of force applied to the disc stack by the deformation of the clamp by the pressure of the screws could be both easily selected and easily controlled.

A particular drawback with this type of clamp is also evident from the figure. Since the screws 50 are driven through the disc clamp 46 into the spindle motor hub 36, the heads of the screws project significantly above the spindle motor. This causes the space above the spindle motor and below the top cover 6 to be relatively large, thus "wasting" vertical space in the overall disc drive.

Figure 3:
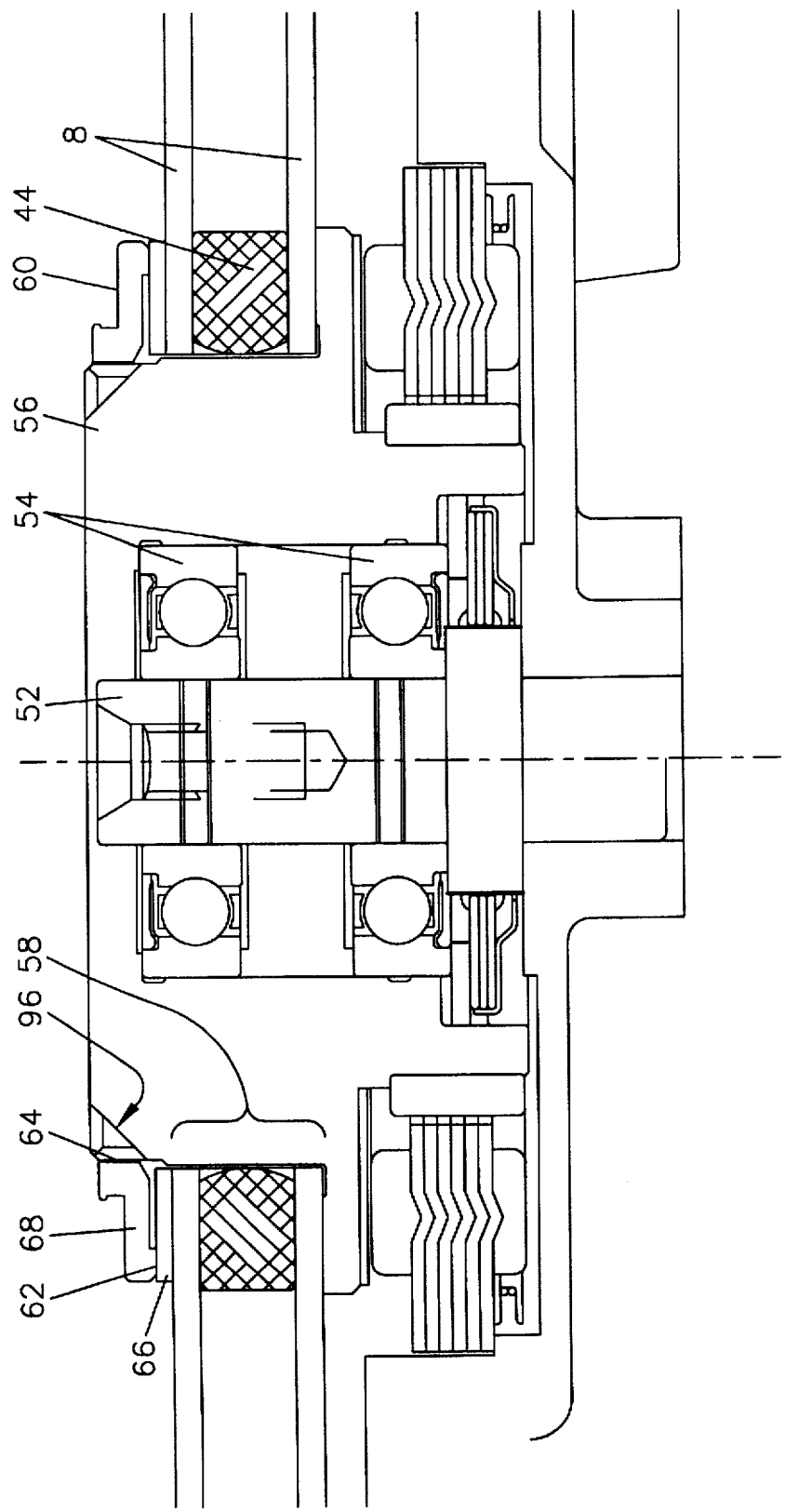
FIG. 3 is a section elevation view of a spindle motor/disc stack assembly showing a second prior art disc clamping system.

Turning now to FIG. 3, another prior art disc drive clamping system is shown, again in section elevation view. As in the discussion of FIG. 2 above, this configuration includes two discs 8 and a stationary shaft 52 on which are mounted upper and lower ball bearing assemblies 54. The spindle motor hub 56 is mounted to the outer races of the ball bearing assemblies 54 for rotation, and the spindle motor hub includes a cylindrical disc mounting portion 58 with an outer diameter substantially equal to the inner diameter of the discs 8. A disc spacer 44 is also shown, to maintain desired spacing between the discs 8.

FIG. 3 also shows a heat-expandable disc clamp ring 60, which has several functional features. As can be seen in the figure, the lower surface of the disc clamp ring 60 is stepped to form a disc stack contact surface 62 near its outer diameter. The innermost surface of the disc clamp ring 60 forms a hub contact surface 64 which engages a mating portion of the spindle motor hub 56. The spindle motor hub 56 and disc clamp ring 60 are dimensioned such that the outer diameter of the spindle motor hub 56 is slightly larger than the inner dimension of the disc clamp ring 60 when the parts are fabricated. Assembly of the disc clamp ring 60 onto the spindle motor hub 56 is accomplished by heating the disc clamp ring 60 to a temperature significantly higher than the ambient temperature at which the disc drive is intended to operate. This heating causes the disc clamp ring 60 to expand, increasing the inner diameter to a size greater than the outer diameter of the spindle motor hub 56. The heated disc clamp ring 60 is then positioned over the top of the spindle motor hub 56 and pressed downward with a desired clamping force with the disc stack contact surface 62 contacting the top of the disc stack. In the specific configuration shown, a flat washer 66 is interposed between the clamp ring 60 and the top disc 8 to aid in the even distribution of the clamping force about the inner portion of the disc stack.

As will be appreciated by those of skill in the art, this type of disc clamping system is much less labor intensive than the screwed-down clamp scheme described above in relationship to FIG. 2. This type of disc clamping does, however, entail a significant area of concern if used in a high volume manufacturing environment.

When assembled in the configuration of FIG. 3, the disc clamp ring 60 acts as a spring with a relatively large spring constant. That is, when the disc clamp 60 has been allowed to cool and shrink into fixed engagement with the spindle motor hub 56, the inner extreme of the disc clamp ring 60 is held stationary, while the disc stack contact surface 62 lies at the opposite end of a clamp spring member 68, which acts as a cantilever beam stressed by the downward force exerted on the disc clamp ring 60 during assembly. The spring constant of a typical disc clamp ring from the prior art would commonly lie in the range of 45–60 thousand pounds/inch, which means that even slight variations in the vertical position of the hub contact surface 64 on the spindle motor hub 56 would cause undesirably wide variations in the clamping force applied to the disc stack at the disc stack contact surface 62.

Figure 4:
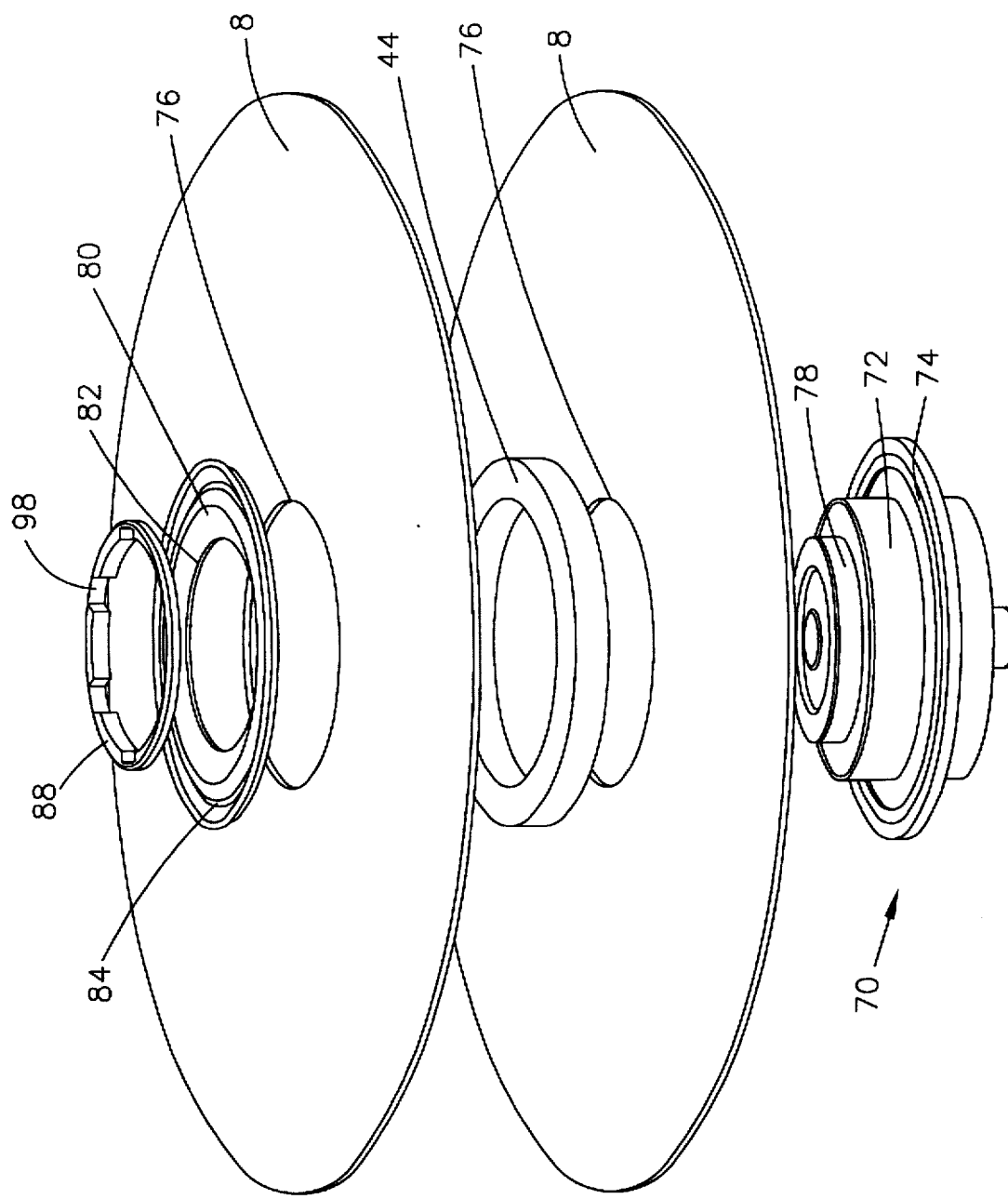
FIG. 4 is an exploded perspective view showing the clamping system of the present invention.

Turning now to FIG. 4, shown is an exploded perspective view of the major elements in the disc clamping system of the present invention. The first element contributing to the present invention is a specially configured spindle motor hub 70. As in the prior art examples discussed above, the spindle motor hub 70 includes a cylindrical disc mounting portion 72 and a radially extending disc mounting flange 74 at one end of the disc mounting portion 72. As is well known to those of skill in the art, the diameter of the disc mounting portion 72 of the spindle motor hub 70 is slightly less than the diameter of the central opening 76 in the discs 8 to facilitate the assembly of the discs 8 onto the spindle motor hub 70 and to allow for differential thermal expansion of these major components. A disc spacer 44 is also shown in FIG. 4. Again, it should be noted that although a two disc configuration is illustrated, the present invention is suitable for configurations featuring both greater or lesser numbers of discs.

One feature that contributes to the present invention is a cylindrical disc clamping portion 78 of the spindle motor hub. This disc clamping portion 78 is located at a second end of the disc mounting portion 72 opposite the disc mounting flange 74, is coaxial with the disc mounting portion 72 and the disc mounting flange 74, and has a diameter less than the diameter of the disc mounting portion 72.

A second element of the disc clamping system of the present invention is a disc clamp spring member 80, formed from planar sheet material. As the figure shows, the disc clamp spring member 80 has a central opening 82 which, in the practice of the present invention, is envisioned to be slightly larger than to the diameter of the disc clamping portion 78 of the spindle motor hub 70, to facilitate assembly. The disc clamp spring member 80 has an outer diameter which is larger than the diameter of the central opening 76 of the discs 8 and includes a circumferential corrugation 84 formed near the outer diameter to form a contact surface (designated 86 in FIG. 5) at the bottom of the circumferential corrugation 84.

The third major element of the disc clamping system of the present invention is a clamp ring 88, which has an inner diameter selected to lock onto the disc clamping portion 78 of the spindle motor hub 70. That is, the inner diameter of the clamp ring 88 is nominally slightly smaller than the outer diameter of the disc clamping portion 78 of the spindle motor hub 70 when all components of the assembly are within the specified operational temperature range of the disc drive.

When assembling a disc drive incorporating the present invention, the discs 8 and any associated spacers 44 are passed over the disc mounting portion 72 of the spindle motor hub 70 and brought to rest on the disc mounting flange 74. The disc clamp spring member 80 is then placed over the disc clamping portion 78 with the contact surface 86 resting on the upper surface of the topmost disc 8 in the disc stack. The clamp ring 88 is then heated and expanded to allow the clamp ring 88 to fit over the disc clamping portion 78 and brought to bear against the disc clamp spring member 80 in an area closely adjacent the central opening 82 in the disc clamp spring member 80. Pressure is then applied to the clamp ring 88 to deform the disc clamp spring member 80 and apply the desired clamping force to the disc stack through the contact surface 86. The clamp ring 88 is allowed to cool in this position, and the contraction of the clamp ring 88 due to this cooling results in an interference fit between the clamp ring 88 and the disc clamping portion 78 of the spindle motor hub 70.

Figure 5:
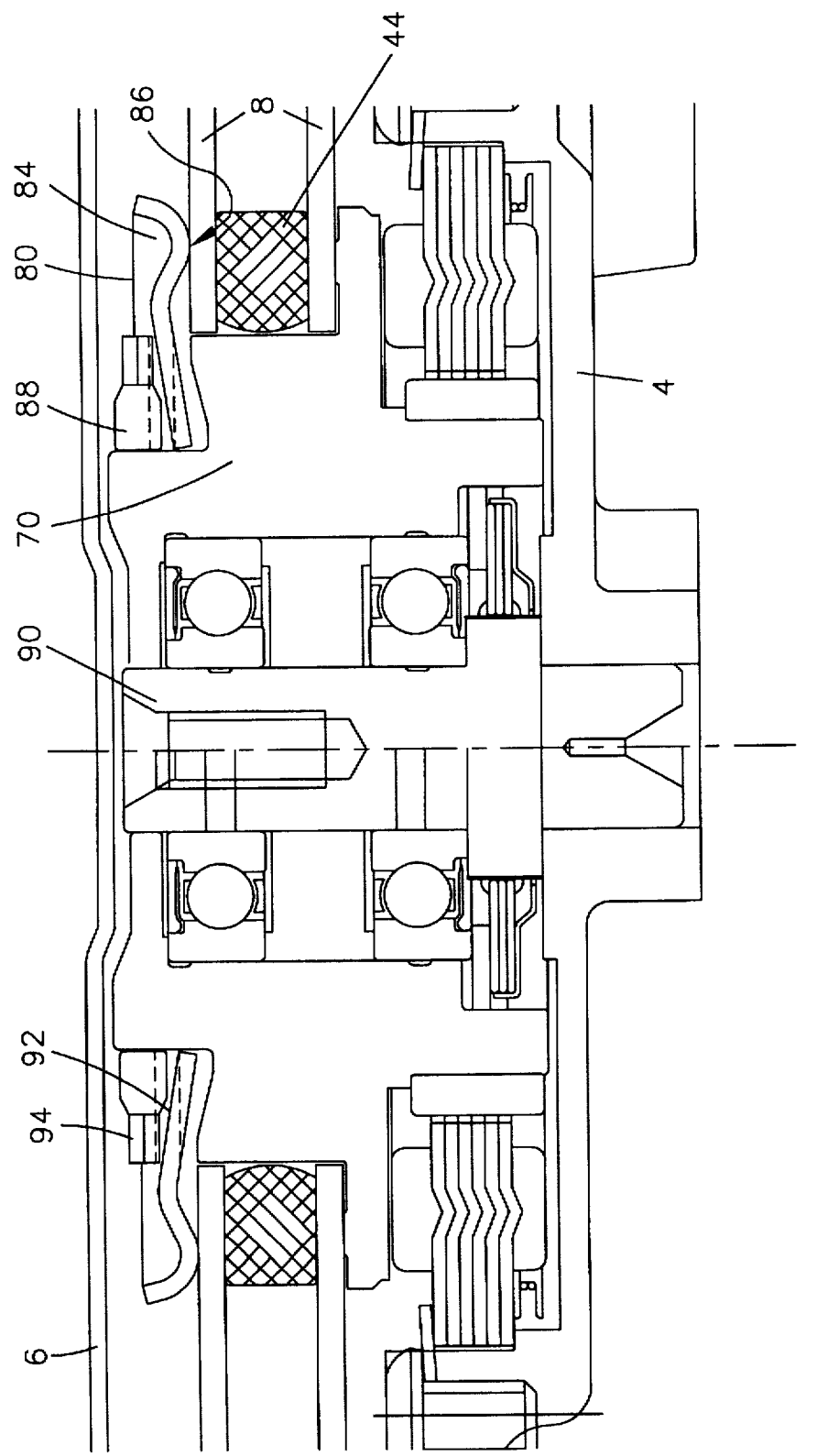
FIG. 5 is a section elevation view of a spindle motor/disc stack assembly showing the clamping system of the present invention.

The relationship of the elements of the present invention as assembled is best seen in FIG. 5, which is a section elevation view, showing the assembled relationship of the elements discussed above. As shown in FIG. 5, the spindle motor (not separately designated) includes a stationary shaft 90, fixedly attached to the base member 4 and top cover 6 of the disc drive. Since the method of attaching this shaft 90 to the housing members is not considered a part of the present invention, no further discussion of this attachment will be made here.

The figure clearly shows that the spindle motor hub 70 includes a disc mounting portion 72 with a disc mounting flange 74 located at a first end thereof. In the example illustrated in FIG. 5, two discs 8 with a single spacer 44 make up the disc stack. The number of discs 8 and spacers 44 is not, and should not be considered to be, limiting to the scope of the present invention. As can be seen, the disc mounting portion 72 of the spindle motor hub 70 has a diameter slightly less than the inner diameter of the discs 8 and spacer 44, to allow the discs 8 and spacer 44 to be assembled onto the spindle motor hub 70. The figure also shows the disc clamping portion 78 of the spindle motor hub 70 to have a diameter significantly less than the diameter of the disc-mounting portion 72. The disc clamp spring member 80 is shown with its contact surface 86 bearing on the inner portion of the top disc 8, while its central opening 82 can be seen to have a diameter intended to closely cooperate with the disc clamping portion 78 of the spindle motor hub 70.

As the figure illustrates, the clamp ring 88 is engaged with the outer surface of the disc clamping portion 78 of the spindle motor hub 70, and also with the upper surface of the spring member 80 at a location closely adjacent the central opening (82 in FIG. 4) in the spring member 80. The clamping force applied to the discs 8 is provided when the clamp ring 88 presses downward on the inner portion of the spring member 80 and deforms the spring member 80 from its unloaded condition (shown in FIG. 5 by the dashed line) to its loaded condition. The clamp ring 88 also includes a bevel 92 on its outer lower corner, which is at an angle greater than that assumed by the inner portion of the spring member 80 when in its assembled loaded condition. This bevel 92 ensures that the contact between the clamp ring 88 and the spring member 80 is restricted to a single circular contact area.

It will be apparent to a person of skill in the art that the disc clamping system of the present invention allows for easily selectable and controllable clamping force. That is, once a desired clamping force is determined (based on the number of discs in the stack, specified mechanical shock loads, and other known conditions), it is a relatively easy exercise in proper engineering techniques to select a material and dimensions for the spring member 80 and calculate how much force must be applied by the clamp ring 88 to the spring member 80 to created the desired clamping force.

Furthermore, since the resilience of the clamping system resides in the spring member 80 and not in the heat-expandable clamp ring as in the prior art of FIG. 3, minor variations in the final vertical position of the clamp ring 88 will not produce drastic changes in the clamping force, as was noted above in the discussion of FIG. 3.

FIG. 5 also shows a balance clip 94 mounted to the outer surface of the clamp ring 88. The balance clip 94 is not intended to be part of or limiting to the present invention, and its inclusion is purely directed toward the disclosure of the presently envisioned best mode of forming the clamping system of the present invention.

Another aspect of the present invention, certain features are included in the major elements of the clamping system to facilitate rework during the manufacturing operation or repair of the disc drive unit after manufacture. Such rework or repair may become necessary and it is always desirable to salvage as many "good" components as possible to minimize costs. Should some fault be detected in the spindle motor/disc stack area, it would be desirable to provide some way of easily removing the clamping system to allow disassembly.

Returning to FIG. 3, shown is a prior art solution to the problem of rework and repair of the spindle motor/disc stack assembly. Specifically, the figure show a bevel 96, which is one of a plurality of such bevels spaced about the upper end of the spindle motor hub 56 above the disc mounting portion 58. Since the inner surface of the disc clamp ring 60 is a continuous cylindrical surface in this prior art clamping system, these bevels 96 provide locations at which a clamp removal tool (not shown) may be inserted and brought to bear on the inner surface of the disc clamp ring 60. Such a clamp removal tool may be of the type which will heat the disc clamp ring 60 and thus expand the disc clamp ring 60 for removal from the assembly, or it may be a simple mechanical tool which exerts sufficient force on the inner surface of the disc clamp ring 60 to "yield" the material and allow removal.

While this combination of bevels 96 on the spindle motor hub 56 does allow for removal of the disc clamp ring 60, it does bear a severe cost burden. That is, the cost of machining the bevels 96 in the spindle motor hub 56 may run to several dollars per disc drive. This is a consequence to be avoided if possible in the disc drive industry, since disc drives are made in very high numbers and are always under extreme market pressures to reduce manufacturing costs and subsequent customer pricing.

Turning again to FIG. 4, the alternative adaptation of components to allow disassembly as provided by the disc clamping system of the present invention can be seen. Specifically, an examination of FIG. 4 will show that the disc clamping portion 78 of the spindle motor hub 70 is a simple cylindrical surface, thus eliminating the costly machining of bevels, as shown in the prior art of FIG. 3. Instead, the disc clamp ring 88 includes a plurality of notches 98, spaced about the inner surface of the disc clamp ring 88, allowing the insertion of a disc clamp removal tool (again not shown) as described above. Moreover, since the present invention envisions the disc clamp ring 88 to be formed using an extrusion process, the notches 98 can formed by the extrusion die, and thus add no additional cost to the disc drive.

It will be clear that the present invention is well adapted to carry out the objects and attain the ends and advantages set forth above, as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a disc drive including a spindle motor having a hub for mounting at least one disc for rotation, the hub including a cylindrical disc mounting portion having a first diameter substantially equal to an inner diameter of each disc to be mounted thereon, and a disc flange extending radially outward from the first diameter at one end of the disc mounting portion, a disc clamping system for clamping said at least one disc against the disc flange comprising a cylindrical disc clamping portion of the hub, located at a second end of the disc mounting portion opposite the disc flange, having a second diameter less than said first diameter;

a spring member, formed of a substantially planar material in the shape of a disc with a diameter larger than the first diameter, and having a circumferential corrugation closely adjacent the outer extreme of the spring member forming a spring member contact surface which forms a single circular contact for engagement with the upper surface of said at least one disc near the inner diameter of the disc, the spring member having a central opening substantially equal to the second diameter and fitting over the disc clamping portion of the hub; and a clamp ring having an inner diameter substantially the same as the second diameter and an inner surface for engaging the disc mounting portion of the hub and a lower, outer clamp ring contact area bearing on an inner portion of the spring member and deforming the spring member to create a clamping force transferred to said at least one disc through the spring member contact surface;

said lower outer contact area of said clamp ring including a beveled region on its lower, radially outer corner which is at an angle greater than that assumed by said inner portion of said spring member in its assembled, loaded condition so that contact between said clamp ring and said spring member is restricted to a single, circular contact area, so that a contact region between said clamp ring and said spring member is a single, circular contact.

2. A disc clamping system as claimed in claim 1 wherein the clamp ring further comprises a plurality of notches in the inner surface of the clamp ring.

3. A disc clamping system as claimed in claim 1 wherein the clamp ring is heat expandable to slide over said second diameter, cooling of said clamp ring causing functional engagement of said second diameter of said hub.

4. A disc clamping system as claimed in claim 1 wherein said clamping ring axially presses against a radially inner region of said spring member axially displacing said radially inner region to cause said circumferential corrugation to press against said disc and hold said disc in place.

5. In a disc drive including a spindle motor having a hub for mounting at least one disc for rotation, the hub including a cylindrical disc mounting portion having a first diameter and a disc flange extending radially outward from the first diameter at one end of the disc mounting portion, a disc clamping system for clamping said at least one disc against the disc flange comprising a cylindrical disc clamping portion of the hub, located at a second end of the disc mounting portion opposite the disc flange, having a second diameter less than said first diameter:

a spring member, formed of a substantially planar material in the shape of a disc with a diameter larger than the first diameter, and having a circumferential corrugation closely adjacent the outer extreme of the spring member forming a spring member contact surface which forms a single circular contact for engagement with the upper surface of said at least one disc near the inner diameter of the disc, the spring member having a central opening substantially equal to the second diameter and fitting over the disc clamping portion of the hub; and a clamp ring having an inner diameter substantially the same as the second diameter and an inner surface for engaging the disc mounting portion of the hub and a lower clamp ring contact surface bearing on an inner portion of the spring member closely adjacent the central opening of the spring member and forming the spring member to create a clamping force transferred to said at least one disc through the spring member contact surface; said lower outer surface of said clamp ring including a beveled region which is of an angle greater than that assumed by said inner portion of said spring member in its assembled, loaded condition so that a contact region between said clamp ring and said spring member is a single, circular contact.

6. A disc clamping system as claimed in claim 5 wherein the clamp ring further comprises a plurality of notches in the inner surface of the clamp ring.

7. A disc clamping system as claimed in claim 5 wherein the clamp ring is heat expandable to slide over said second diameter, cooling of said clamp ring causing functional engagement of said second diameter of said hub.

8. A disc clamping system as claimed in claim 5 wherein said clamp ring axially presses against said radially inner region of said spring member axially displacing said radially inner region to cause said circumferential corrugation to press against said disc and hold said disc in place.

* * * * *